(12) United States Patent
Nicolini et al.

(10) Patent No.: US 9,664,182 B2
(45) Date of Patent: May 30, 2017

(54) SHAPE MEMORY ALLOY ACTUATING ELEMENT WITH IMPROVED FATIGUE RESISTANCE

(71) Applicant: SAES GETTERS S.P.A., Lainate (IT)

(72) Inventors: Emanuele Nicolini, Oleggio (IT); Stefano Alacqua, Como (IT)

(73) Assignee: SAES GETTERS S.P.A., Lainate (MI) (IT)

(*) Notice: Subject to any disclaimer, the term of this patent is extended or adjusted under 35 U.S.C. 154(b) by 191 days.

(21) Appl. No.: 14/436,076

(22) PCT Filed: Nov. 20, 2013

(86) PCT No.: PCT/IB2013/060273
§ 371 (c)(1),
(2) Date: Apr. 15, 2015

(87) PCT Pub. No.: WO2014/080344
PCT Pub. Date: May 30, 2014

(65) Prior Publication Data
US 2015/0285229 A1 Oct. 8, 2015

(30) Foreign Application Priority Data
Nov. 22, 2012 (IT) .............................. MI2012A1988

(51) Int. Cl.
*F03G 7/06* (2006.01)
(52) U.S. Cl.
CPC .................................... *F03G 7/065* (2013.01)
(58) Field of Classification Search
CPC ..................................................... F03G 7/065
(Continued)

(56) References Cited

U.S. PATENT DOCUMENTS 4,027,479 A 6/1977 Cory
4,559,512 A * 12/1985 Yaeger ............... H01H 61/0107
337/140
(Continued)

FOREIGN PATENT DOCUMENTS

EP 1610418 12/2005
EP 2171183 4/2010
(Continued)

OTHER PUBLICATIONS

Polinsky, M.A. et al., "A Study of the Effects of Surface Modifications and Processing on the Fatigue Properties of Niti Wire" *SMST-2006 Proceedings of the International Conference on Shape Memory and Superelastic Technologies* (2008) pp. 1-17.
(Continued)

*Primary Examiner* — Hoang Nguyen
(74) *Attorney, Agent, or Firm* — Steinfl + Bruno LLP

(57) ABSTRACT

An SMA wire actuating element is described, having a shape memory alloy wire intended to be operably connected to an actuatable element of an actuator device, and a first and a second elongated elements made of a non-SMA material. The elongated elements are respectively restrained at a first end thereof to the ends of the shape memory alloy wire by way of crimping means of the SMA wire actuating element. The SMA wire actuating element further has a first and a second connection means intended to be operably connected to a body of the actuator device. The elongated elements are respectively restrained at a second end thereof to the connection means, whereby the portion of each elongated element comprised between its first and second ends is free to move between the crimping means and the connection means.

8 Claims, 3 Drawing Sheets

(58) Field of Classification Search
USPC .......................... 60/527–529; 310/306, 307
See application file for complete search history.

(56) References Cited

U.S. PATENT DOCUMENTS

| | | | | |
|---|---|---|---|---|
| 4,965,545 | A | 10/1990 | Johnson | |
| 5,396,769 | A * | 3/1995 | Brudnicki | F03G 7/065 60/527 |
| 7,555,900 | B1 * | 7/2009 | Vallance | F03G 7/065 60/528 |
| 2003/0180567 | A1 * | 9/2003 | Dunne | B21F 15/00 428/583 |
| 2004/0035108 | A1 * | 2/2004 | Szilagyi | B23Q 1/5462 60/528 |
| 2005/0199845 | A1 | 9/2005 | Jones et al. | |
| 2012/0198835 | A1 | 8/2012 | Skurkis et al. | |

FOREIGN PATENT DOCUMENTS

| | | |
|---|---|---|
| JP | 63-021367 | 1/1988 |
| WO | 2004/097218 A2 | 11/2004 |
| WO | 2007/113478 | 10/2007 |
| WO | 2008/099156 | 8/2008 |
| WO | 2009/000859 | 12/2008 |

OTHER PUBLICATIONS

International Search Report mailed on Mar. 12, 2014 for PCT/IB2013/060273 filed on Nov. 20, 2013 in the name of Saes Getters S.P.A.
Written Opinion mailed on Mar. 12, 2014 for PCT/IB2013/060273 filed on Nov. 20, 2013 in the name of Saes Getters S.P.A.
International Preliminary Report on Patentability mailed on Feb. 6, 2015 for PCT/IB2013/060273 filed on Nov. 20, 2013 in the name of Saes Getters S.P.A.

* cited by examiner

SHAPE MEMORY ALLOY ACTUATING ELEMENT WITH IMPROVED FATIGUE RESISTANCE

CROSS REFERENCE TO RELATED APPLICATIONS

The present application is the US national stage of International Patent Application PCT/IB2013/060273 filed internationally on Nov. 20, 2013 which, in turn, claims priority to Italian Patent Application No. MI2012A001988 filed on Nov. 22, 2012.

The present invention relates to Shape Memory Alloy (SMA) wires having an improved fatigue resistance useful to be used as active material wire in actuator devices in order to reduce their premature failure in correspondence to the connections of said active material wires to structural bodies of the actuator devices.

An actuator device can be considered as a mechanical structure comprising a structural body, an actuatable element that can undergo a relative displacement respect the structural body and an actuating element operably connected to said actuatable element.

SMA wires are often described as possible active material in actuator devices, i.e. a material suitable to be used to obtain an actuating element for an actuator. As for example described in the European Patent EP 2171183 B1 in the Applicant's name, the use of SMA wires is related to their ability to transfer a load and cause a linear displacement of at least one element in the structural body of an actuator system. This displacement can be obtained by thermal activation of the SMA wire.

It is known that the shape memory phenomenon consists in the fact that a mechanical piece made of an alloy that exhibits said phenomenon is capable of transitioning, upon a temperature change, between two shapes that are preset at the time of manufacturing, in a very short time and without intermediate equilibrium positions. A first mode in which the phenomenon may occur is called "one-way" in that the mechanical piece can change shape in a single direction upon the temperature change, e.g. passing from shape A to shape B, whereas the reverse transition from shape B to shape A requires the application of a mechanical force.

On the contrary, in the so-called "two-way" mode both transitions can be caused by temperature changes, this being the case of the application of the present invention. This occurs thanks to the transformation of the micro-crystalline structure of the piece that passes from a type called martensitic, stable at lower temperatures, to a type called austenitic, stable at higher temperatures, and vice versa (M/A and A/M transition).

A SMA wire has to be trained so that it can exhibit its features of shape memory element, and the training process of a SMA wire usually allows to induce in a highly repeatable manner a martensite/austenite (M/A) phase transition when the wire is heated and to induce an austenite/martensite (A/M) phase transition when the wire is cooled. In the M/A transition the wire undergoes a shortening by 3-5% which is recovered when the wire cools down and through the A/M transition returns to its original length.

This characteristic of SMA wires to be contracted upon heating and then re-extended upon cooling has been exploited for a long time to manufacture actuators that are very simple, compact, reliable and inexpensive. An actuator device comprising a SMA wire is typically used to make an actuatable element to move from a first stable position to a second stable position and vice versa. It should be noted that the term "actuatable element" is intended here to have a very generic meaning since it can take countless shapes according to specific manufacturing needs.

The SMA wire is usually connected to the actuatable element by coupling members at connection points. A typical coupling consists in crimping the SMA wire directly to a connection means, as for example an O-ring brass ring crimp connector or a binding crimp connector.

Slippage and wire breakage in overload conditions in correspondence to said connection points are commonly considered among the most critical causes of failure of actuator devices.

The most serious technical problem is the premature failure of SMA wires at its connection points due to fatigue. Crimping in fact often results in local deformations and/or microscopic cracks of the wire at its connection points, which result in a progressive and localized structural damage that occurs when a SMA wire actuating element is subjected to cyclic loading, i.e. during its normal operation.

This problem most frequently occurs in non-linear actuator devices, wherein the SMA wire actuating element is not coplanar with the body of the actuator device so as to generate non-linear actuating forces, which is typically the case of e.g. actuators for flow control valves and anti-glare rear-view mirrors. Since the ends of the SMA wire actuating element are crimped over the body of the actuator device, the non-linear actuating forces exerted by the SMA wire result not only in pulling stresses at the connection points, but also in bending and torsion stresses which increase the local overall stress condition of the SMA wire causing its premature failure.

The International patent application published as WO 2004/097218 (NANOMUSCLE INC) describes a rotatable flap for flow controllers that is actuated by one or more SMA wires. In operation, the rotatable flap rotates about a predetermined axis by a degree determined by an amount of rotational force exerted by the SMA wires. This document is silent on how to overcome the premature failure of SMA wires related to fatigue, with particular reference to its connection points with the attachment anchor or the shaft of the rotatable flap.

The U.S. patent application published as US 20050199845 (GM GLOBAL TECHNOLOGY OPERATIONS LLC) discloses a large number of embodiments based on flap actuators to be used in active pressure relief valves wherein active actuating elements could be in spring or wire form. Shape memory alloy wires are described as possible alternative active actuating elements and the document is focused on coupling one of their extremities to one of the lateral sides of a flap element. In other words, even if the movement results in a rotation of the flap element, SMA wires are used in order to exert, as common practice, a pulling force on an actuatable element (i.e. the flap element) with respect to a fixed point, which is the connection point of the SMA wire to the body of the flap actuator. Said embodiments, moreover, require an internal positioning of the structural elements of the actuator that negatively affects the overall size of the actuator device, i.e. does not allow a desirable relatively small depth. Anyway, in all the embodiments, even if only related to linear displacement, the problem of the resistance of the wires to fatigue is not considered.

The U.S. patent application published as US 20120198835 A (GM GLOBAL TECHNOLOGY OPERATIONS LLC) discloses several kinds of joining methods of an active material wire to a connection element (i.e. an O-ring connector) wherein the resistance of active materials wires is improved by providing them with an enlarged end-portion. This allows to possibly avoid the use of crimping methods of connection and therefore to reduce the potential damaging of active material wires. All these methods have the drawback of requiring a good control in the manufacturing process for the formation of the enlarged end-portion of the wire in order to avoid build-up of internal stresses or collateral structural changes to the SMA wire. Moreover, the active material wires described in US 20120198835 A are directed only to linear displacement of at least one actuatable element of an actuator device, but the document is silent about the application of active material wires in actuator devices having a non-linear displacement, such as for example rotatable flap actuator devices.

U.S. Pat. No. 4,965,545 discloses a rotary actuator which provides a differential pulley pair having a shape memory alloy wire. The shape memory alloy wire is thermally cycled through its phase change transition temperature and contracts. The ends of the wires are fixed to opposite sides of the pulley pair, so that tension forces applied by the ends of the wires result in a net torque which causes relative rotation between the pulley pair and a reference base. Thermal cycling is obtained by making an electrical current to circulate through the shape memory alloy wire by way of electrical leads connected at the ends of the wires fixed to the opposite sides of the pulley pair.

The international publication WO 2007/113478 A1 discloses a camera lens actuation apparatus for driving motion of a camera lens supported on a support structure by a suspension system. The apparatus incorporates a subassembly comprising a SMA wire connected to at least one mounting member which is mounted to the support structure. A control circuit controls heating of the SMA wire in response to a measure of its resistance.

In an embodiment of the actuation apparatus disclosed in WO 2007/113478, a piece of a SMA wire is arranged in a continuous loop with its ends and overlapping. Two mounting members each formed as an elongate piece of metal are connected to the piece of SMA wire by crimping. In particular, the ends of the mounting members and are each crimped over the piece of SMA wire to form respective crimping means. The subassembly is then mounted into the camera by fixing the two mounting members onto the outside of an annular wall of the support structure and by connecting the SMA wire to the support structure. The mounting members are mounted in recesses provided in the annular wall, for example by adhesive, swaging of the wall or some other means.

However, both in the rotary actuator of U.S. Pat. No. 4,965,545 and in the camera lens actuation apparatus of WO 2007/113478 the SMA wires exert non-linear actuating forces which result not only in pulling stresses, but also in bending and torsion stresses which, as explained above, increase the local overall stress condition of the SMA wires at their crimped connection points, thus causing their premature failure.

The object of the present invention is therefore to overcome the drawbacks and limits of known actuating elements based on SMA wires, and in particular to provide a SMA wire actuating element having an improved fatigue resistance.

According to the invention, a SMA wire actuating element is provided comprising a shape memory alloy wire intended to be operably connected to an actuatable element of an actuator device, a first and a second elongated elements made of a non-SMA material, said elongated elements being respectively restrained at a first end thereof to the ends of the shape memory alloy wire by way of crimping means. The SMA wire actuating element further comprises a first and a second connection means intended to be operably connected to a body of an actuator device, the elongated elements being respectively restrained at a second end thereof to said connection means, whereby the portion of each elongated element comprised between its first and second ends is free to move between the crimping means and the connection means.

Thanks to these features, the SMA wire actuating element of the invention is provided with a pair of deformable end-members formed by the elongated members and the connecting elements restrained at their ends, these end-members being suitable to be connected to an actuator device in place of the ends of the SMA wire actuating element in order to relieve the fatigue stresses at its crimped ends during its operation.

The elongated members are configured so as to be elastically flexible under normal operation conditions of the SMA wire actuating element, so as to effectively absorb the stresses caused by the movements of the SMA wire actuating element without being permanently deformed. Hence, the performance of the SMA wire actuating element can be maintained over time.

The main advantage offered by the invention is that the presence of a pair of elastically deformable end-members allows to make a SMA wire actuating element particularly suitable for non-linear actuator devices, such as e.g. actuators for flow control valves and anti-glare rear-view mirrors.

Another advantage offered by the invention is that the SMA wire actuating element may also be effectively used in standard linear actuator devices.

The presence of elastically yieldable end-members also advantageously allows to ease mounting of the SMA wire actuating element on an actuator device, the active material of a SMA wire being generally poorly bendable due to its training process and therefore causing mounting problems.

The invention will be further described with reference of the following drawings.

Figure 1:
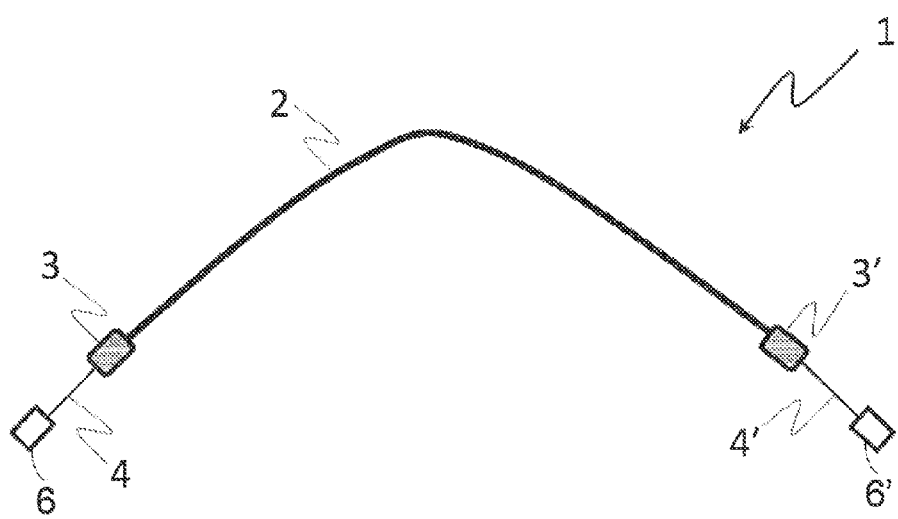
FIG. 1 shows a schematic representation of an actuating wire element according to the present invention.

FIG. 1 shows a SMA wire actuating wire element 1 comprising a SMA wire 2 and two elongated elements 4 and 4' made of a non-SMA material. The elongated elements 4 and 4' are respectively connected at a first end thereof to each end of the SMA wire 2 by crimping means 3 and 3'.

Second ends, or free ends, of the elongated elements 4, 4' opposite to the first ends can be fixed to respective connection points available in a body of an actuator device (not shown). To this aim, the SMA wire actuating element 1 further comprises a first and a second connecting means 6, 6' to which the elongated elements 4, 4' are respectively restrained at their second ends.

The elongated elements 4 and 4' may be plates or, more preferably, wires and may be made of stainless steel, polymeric materials, carbon fibers or superelastic Nitinol.

The elongated elements are so configured to be elastically flexible under normal operation conditions of the SMA wire actuating element 1. To this aim, the elongated elements 4, 4' preferably have a ratio between diameter or thickness and length, i.e. an slenderness ratio, comprised between about 1:50 and 1:75. For instance, in the case of elongated elements in the form of wires, the diameter may be chosen between 100 and 200 μm and the length between 5 and 15 mm.

In order to distinguish if an elongated element 4 or 4' is suitable to be used to obtain an actuating element according to the present invention, it is important to evaluate whether it is more elastic and flexible relative to the SMA wire 2. An element is defined "elastic" if it can recover size and shape after deformation. An element is defined "flexible" if it can be bent without breaking. Both these properties of an elongated element can be evaluated by the rotary bending test, as described in the scientific publication "A STUDY OF THE EFFECTS OF SURFACE MODIFICATIONS AND PROCESSING ON THE FATIGUE PROPERTIES OF NITI WIRE" by Mark A. Polinsky et al., published in the 2008 on the SMST-2006 Proceedings of the International Conference on Shape Memory and Superelastic Technologies.

Crimping means suitable to be used to connect the ends of the SMA wire to the first ends of the elongated elements 4, 4' may be selected among standard crimping means such as e.g. barrel crimps.

Connecting means 6, 6' suitable to be used to connect the second ends of the elongated elements 4, 4' to a body of an actuator device may be barrel crimps or equivalent crimping means, flag and straight or ring and spade tongue terminals. Said terminals can be connected to the actuator body by heat staking, ultrasound melting, hot air melting and pressure probe of a plastic PIN on a standard crimp.

The connection means 6, 6' may advantageously be formed integrally with the second ends of the elongated elements 4, 4'.

The elongated elements 4, 4' and the connecting means 6, 6' together form elastically deformable end-members suitable to be connected to an actuator device in place of the ends of the SMA wire actuating element. Thanks to their elastic and flexible configuration relative to the normal operating conditions to which the SMA wire actuating element will be subjected, these deformable end-members act as strain reliefs allowing to absorb deformations of the SMA wire 2 at its ends fixed to the crimping means 3, 3'. As explained above in fact, these deformations would cause premature failure of SMA wires due to accumulation of fatigue stresses over time. Hence, provision of the elongated elements 4, 4' and of the connecting means 6, 6' allows to improve the fatigue resistance of the SMA wire actuating element with respect to SMA wire actuating elements known in the art, that are directly fixed at suitable connection points on the body of an actuator like those disclosed in U.S. Pat. No. 4,965,545 and WO 2007/113478.

Despite their filiform shape in fact SMA wires are not elastically deformable in operation due to the training process they are subject to during their manufacturing in order to achieve the "two-way" transition mode. On the contrary, the elongated elements are made of a non-SMA material, so that they are not subject to structure transitions as SMA wires upon temperature changes, and can thus effectively relieve fatigue stresses during operation of the SMA wire actuating element 1.

In particular, it has been found that the fatigue limit of a SMA wire actuating element according to the invention is reached after more than $10^6$ cycles, whereas known SMA wire actuator elements can stand less than $10^4$ cycles.

SMA wires 2 suitable to be used in order to achieve the above described results can have a diameter comprised between 75 and 200 μm and a length comprised between 50 and 200 mm.

SMA wire actuating elements according to the present invention may thus effectively replace known SMA wire actuating elements resulting in an increased service life of an actuator device.

The increased fatigue resistance of the SMA wire actuating elements of the invention is surprisingly effective in non-linear actuator devices, wherein the SMA wire actuating elements are assembled so as to exert non-linear forces, i.e. forces that are generally not coplanar to the body of the actuator. This is for example the case of actuator devices suitable to be used in flow control valves or anti-glare rear-view mirrors, wherein the SMA wire actuating element is mounted according to a V-shaped configuration.

Figure 2:
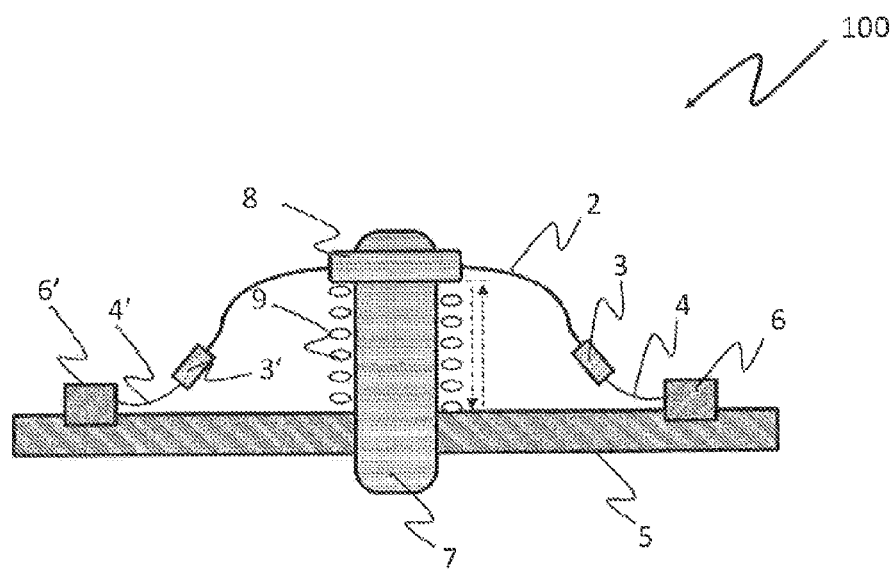
FIG. 2 shows a schematic representation of an embodiment of an actuator device comprising an actuating wire element according to the present invention.

FIG. 2 schematically shows an actuator device 100 comprising a SMA wire actuating element according to the invention. The SMA wire actuating element 1 is connected to a body 5 of the actuator device 100 at the connection means 6 and 6'. An actuatable element 7 of the actuator device is coupled to a bias element such as for example a spring 9 and is suitable to be moved perpendicularly to the body 5 of the actuator device. The SMA wire 2 of the SMA actuating wire element 1 is operably connected to the actuatable element 7 in correspondence to an upper portion 8 thereof. As shown in FIG. 2, a portion of the SMA wire 2 is fitted in a channel crossing the upper portion 8 of the actuatable element 7 from end to end. Alternative ways of coupling the SMA wire 2 to the actuatable element 7 are anyway acceptable, such as for example a groove formed in the upper portion 8 and configured to receive the SMA wire 2. In the assembled configuration the SMA wire actuating element 1 has a V-shape, whereby contractions of the SMA wire 2 upon heating result in non-linear actuation forces relative to the body of the actuator device, in this case perpendicular thereto.

As it may be seen, the elongated elements 4, 4' are bent upon assembling and since they do not undergo structural changes due to heating as the SMA wire does, they can act as strain reliefs by absorbing stresses in place of the SMA wire actuating element 1.

Figure 3:
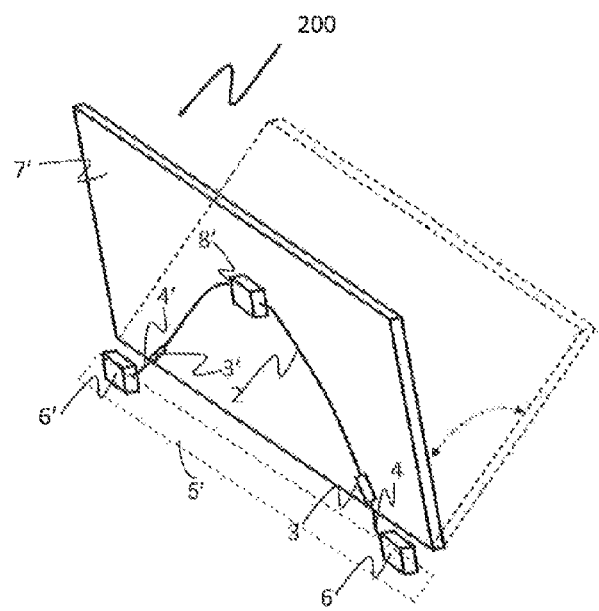
FIG. 3 shows a schematic representation another actuator device comprising an actuating wire element according to the present invention.

FIG. 3 schematically shows another example of an actuator device 200 comprising a SMA wire actuating element 1 according to the invention.

The SMA wire actuating element 1 is connected to a body 5' of the actuator device 200 by the connection means 6 and 6'.

The SMA wire 2 of the SMA wire actuating element 1 is operably connected to an actuatable flap element 7' by way of a coupling element 8', fixed to a surface of the flap element 7'. The SMA wire may e.g. be fitted in a channel crossing the coupling element 8' from end to end or in a groove formed in the surface of the flap element 7', thus resulting the direct insertion of at least a portion of the SMA wire 2 in the body to be moved. The SMA wire actuating element 1 is connected to the body of an actuator device (not shown) through its elongated elements 4 and 4' and connection means 6 and 6'. Also in this case, in the assembled configuration the SMA wire actuating element 1 has a V-shape, whereby contractions of the SMA wire 2 due to heating result in non-linear actuation forces relative to the body 5' of the actuator device 200, in this case a torque that determines rotation of the flap element 7' relative to the body 5' of the actuator device 200.

Both FIGS. 2 and 3 are to be considered only schematic representations of actuating structures in an actuator device. In fact they are strongly simplified in order to facilitate understanding of the invention.

According to a further aspect of the invention, packaging of SMA actuating wire elements may advantageously consist in a coil 10 containing a plurality of SMA wire actuating elements 1, 1', . . . arranged in series.

Figure 4:
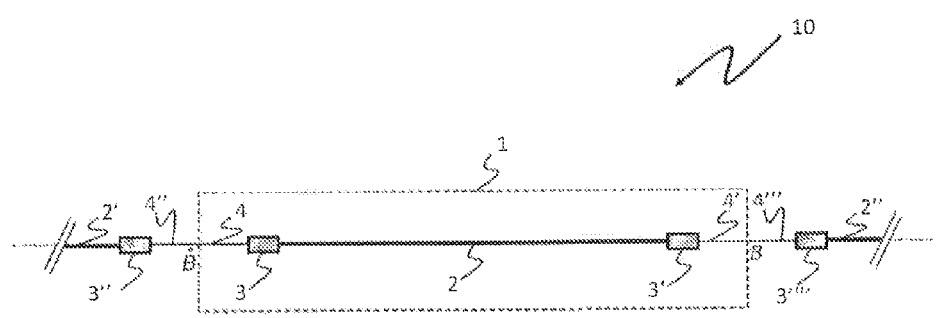
FIG. 4 shows a schematic representation of a portion of a coil comprising a plurality of actuating wire elements according to the present invention.

As shown in FIG. 4, the elongated elements 4, 4' of each SMA wire actuating element 1 are coupled at their second ends with the elongated elements 4" or 4'" belonging to the previous and subsequent SMA wire actuating elements of the series. Coupling between adjacent elongated elements 4 and 4" and 4' and 4'" is carried out by way of the same connection means 6, 6', 6", 6'", . . . suitable to be used to fix the SMA wire actuating on the body of the final actuator device. When the connection means 6, 6', . . . are integrally formed with the second ends of the elongated elements 4, 4', . . . as shown in FIG. 4, said coupling can result in a single elongated element the length of which corresponds to the sum of the elongated elements, an intermediate portion B of the single elongated element having separation means, e.g. a reduced cross section, allowing easy separation of two adjacent SMA wire actuating elements.

The invention claimed is:

1. An SMA wire actuating element comprising:
   a shape memory alloy (SMA) wire adapted to be operably connected to an actuatable element of an actuator device,
   first and a second elongated elements made of a non-SMA material, said elongated elements being respectively restrained at a first end thereof to the ends of the shape memory alloy wire by crimping means of the SMA wire actuating element, and
   a first and a second connection means, adapted to be operably connected to a body of said actuator device, the elongated elements being respectively restrained at a second end thereof to said connection means, whereby a portion of each elongated element comprised between its first and second ends is free to move between the crimping means and the connection means.

2. The SMA wire actuating element according to claim 1, wherein the elongated elements have a ratio between their respective diameter or thickness and their respective length comprised between 1:50 and 1:75.

3. The SMA wire actuating element according to claim 1, wherein the elongated elements are in form of wires.

4. The SMA wire actuating element according to claim 1, wherein the elongated elements are made of a material selected from stainless steel, polymeric materials, carbon fibers and superelastic Nitinol.

5. The SMA wire actuating element according to claim 1, wherein the connection means are formed integrally with the second ends of the elongated elements.

6. The SMA wire actuating element according to claim 1, wherein the elongated elements are configured to be elastically flexible under normal operation conditions of the SMA wire actuating element so as to absorb stresses caused by movements of the SMA wire actuating element without being deformed.

7. An actuator device comprising
   a body,
   an actuatable element, and
   at least one shape memory alloy (SMA) wire actuating element according to claim 1,
   wherein a shape memory alloy wire of said SMA wire actuating element is operably connected to said actuatable element, and
   wherein a first and a second connection means of the SMA wire actuating element are operably connected to said body.

8. The SMA wire actuating element according to claim 1, wherein each of the first and second elongated elements is more elastic and flexible relative to the SMA wire.

* * * * *